Sept. 1, 1931.   F. A. STREICH   1,820,993
DUMP WAGON DOOR OPERATING DEVICE
Filed Jan. 29, 1930   3 Sheets-Sheet 3
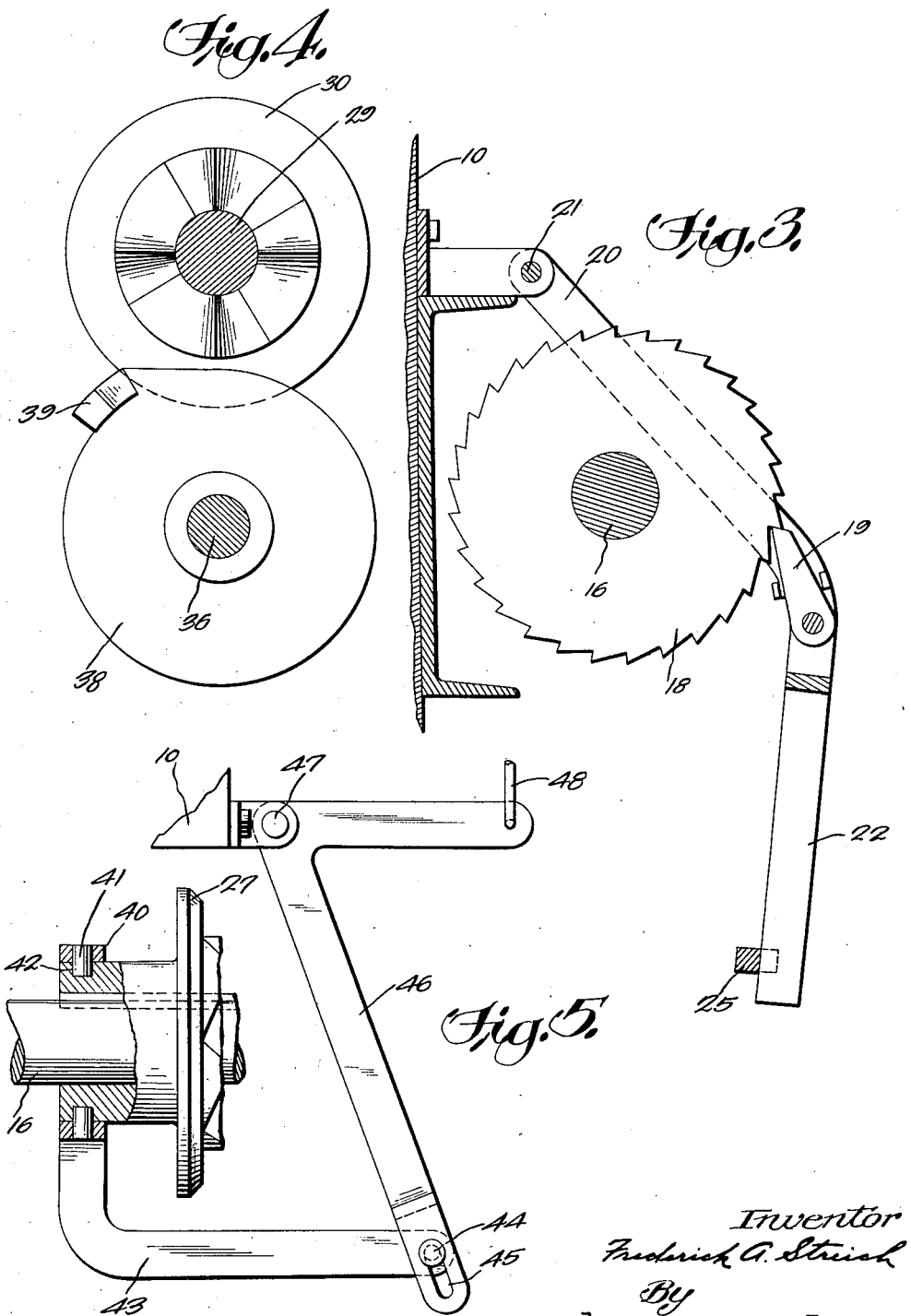

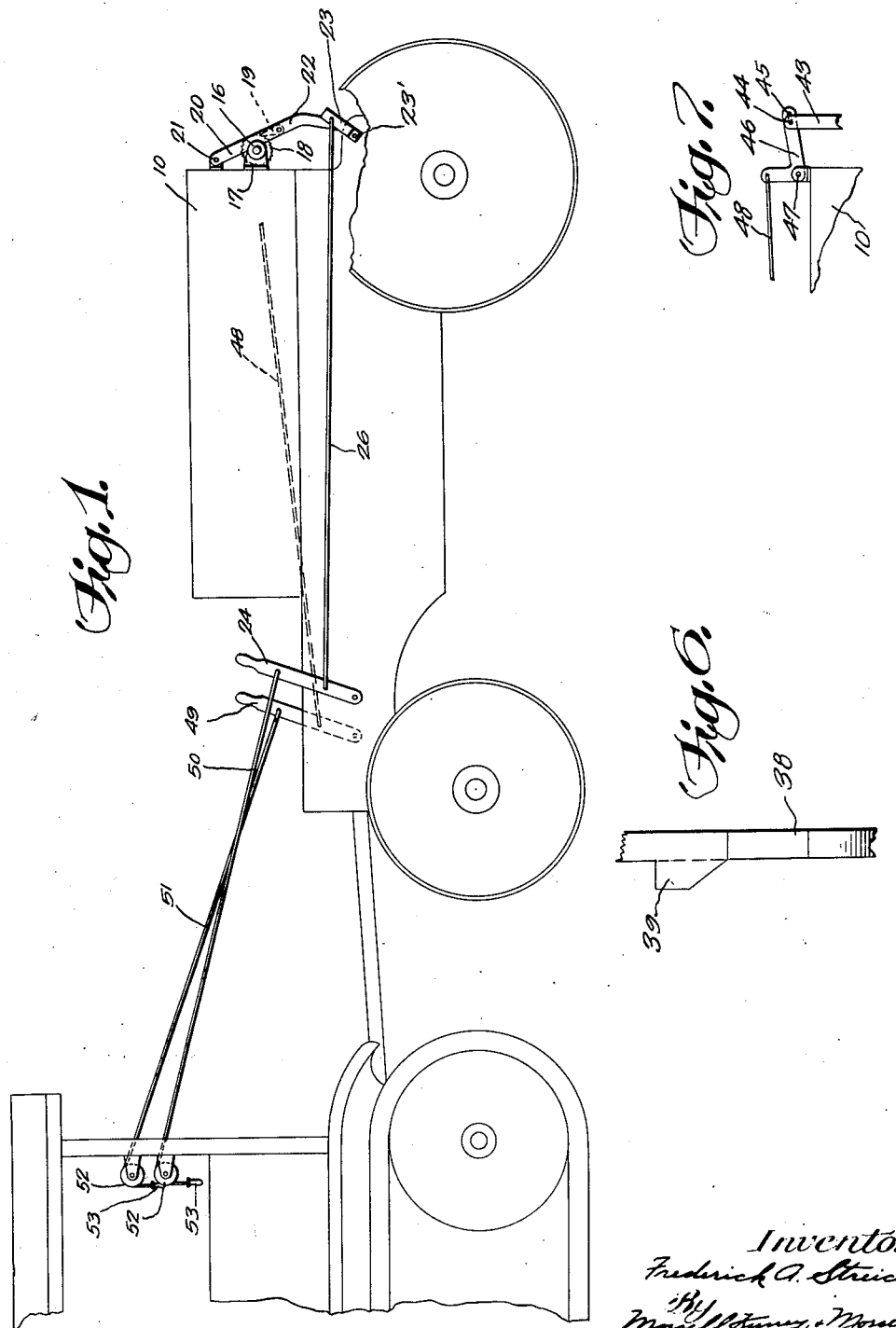

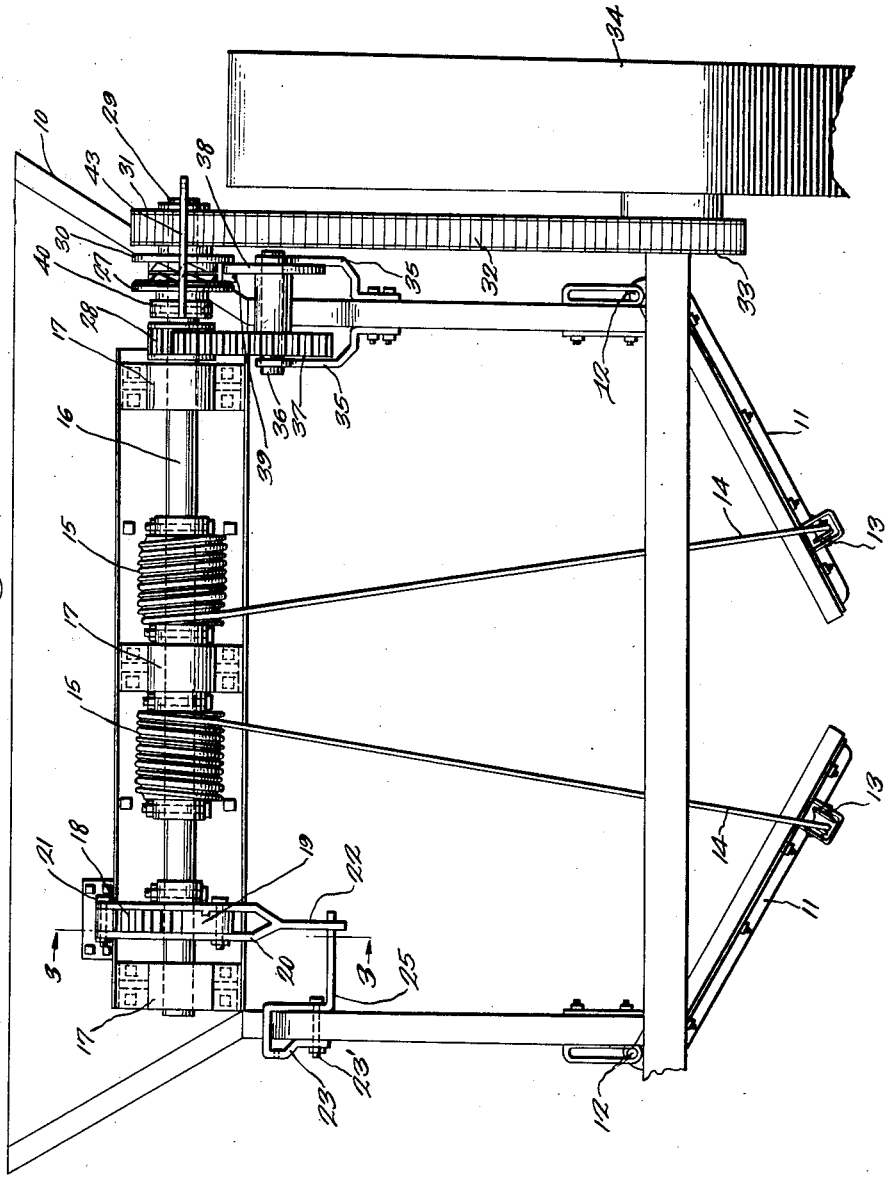

Patented Sept. 1, 1931

1,820,993

UNITED STATES PATENT OFFICE

FREDERICK A. STREICH, OF OSHKOSH, WISCONSIN, ASSIGNOR TO A. STREICH & BRO. COMPANY, OF OSHKOSH, WISCONSIN, A CORPORATION OF WISCONSIN

DUMP WAGON DOOR OPERATING DEVICE

Application filed January 29, 1930. Serial No. 424,203.

This invention relates to improvements in dump wagon door operating devices.

Heretofore, when a dump wagon or trailer was being pulled by a tractor or other vehicle, it was necessary to employ two men, one to drive the tractor and the other to sit in the trailer for the sole purpose of operating the dump doors. Thus extra labor expense was entailed, and as a result, the cost of completing a piece of work was relatively high.

It is one of the objects of the present invention to provide an improved dump wagon door operating device which is automatic in operation, and which, therefore, eliminates the necessity of employing an extra man to operate the dump doors.

A further object of this invention is to provide a device of the class described which can be controlled from a remote point by the driver of the tractor.

A further object of this invention is to provide an improved door operating device which is driven by the rotation of the wheel of the dump wagon or trailer.

A further object of this invention is to provide an improved dump wagon door operating device which is relatively simple in construction, efficient in operation, and well adapted for the purpose described.

With the above and other objects in view, the invention consists of the improved dump wagon door operating device and all its parts and combinations, as set forth in the claims, and all equivalents thereof.

In the accompanying drawings, illustrating one complete embodiment of the preferred form of the invention, in which the same reference numerals indicate the same parts in all of the views:

Fig. 1 is a diagrammatic view showing a portion of a tractor with a dump wagon in connection therewith, the latter being provided with the improved door operating device;

Fig. 2 is a rear view of the dump wagon;

Fig. 3 is an enlarged sectional detail view taken on line 3—3 of Fig. 2;

Fig. 4 is an enlarged detail view showing one of the clutch members and the clutch shifting disk associated therewith;

Fig. 5 is an enlarged detail plan view showing the manually operated clutch shifting mechanism, parts being broken away and parts being shown in section;

Fig. 6 is a fragmentary edge view of the clutch shifting disk; and

Fig. 7 is a plan view of the manual clutch shifting mechanism.

Referring to the drawings, the numeral 10 designates a dump wagon which is provided with a pair of bottom dump doors 11, the latter being hinged to the body as at 12. Pulleys 13 are arranged on the lower side of the doors near the inner edge thereof. Cables 14 having one end secured to the lower portion of the body pass beneath the pulleys 13. The other end of each of the cables is wound on a drum 15. The drums 15 are rigidly mounted on a shaft 16, the latter being journaled in bearings 17 on the upper portion of the rear of the dump wagon (see Fig 2).

Near one end of the shaft is a rigidly mounted ratchet wheel 18 which is normally engaged by a dog 19. The dog 19 is pivotally mounted within the forked portion of a dog supporting member 20. The upper end of the member 20 is pivotally connected to the body as at 21 and the lower end is provided with a depending portion 22 (see Fig. 3). A tripping member 23 is pivotally connected to the wagon body as at 23' and is provided below the pivot with a laterally extending portion 25 which engages beneath the depending portion 22 of the dog supporting member 20. A rod or cable 26 extends between the tripping member 23 and a lever 24 mounted near the front of the dump wagon.

A movable clutch member 27 is splined to the other end of the shaft 10 and adjacent said clutch member is a rigidly mounted pinion gear 28. A short shaft 29 is journaled adjacent the end of the shaft 16 and rigidly mounted thereon is an idle clutch member 30 and a sprocket wheel 31. The sprocket wheel 31 is connected by an endless chain 32 with a sprocket wheel 33, the latter being rigidly connected to the hub of a wheel 34 on the dump wagon.

Mounted below the shaft 16, in bearings 35, is a short shaft 36 carrying a rigidly mounted clutch throw out gear 37 and a rigidly mounted throw out disk 38. The gear 37 engages the pinion 28 on the shaft 16 and the disk 38 rotates between the clutch members 27 and 30. A cam portion 39 formed adjacent the outer periphery of the disk 38 is arranged to cause disengagement of the clutch members as shown in Figs. 2 and 4.

A ring member 40, surrounding the hub of the clutch member 27, has pins 41 projecting inwardly therefrom into an annular groove 42 of the hub (see Fig. 5). An L-shaped arm 43 projecting laterally from the ring 40 is provided on its outer end with a pin 44. The latter is arranged to engage a slot 45 in the end of a bell crank lever 46. The bell crank lever is pivotally connected to the side of the wagon body as at 47. A rod or cable 48 connects one end of the bell crank lever 46 with a lever 49 mounted near the front of the dump wagon.

Cables 50 and 51 each have one end connected to the levers 24 and 49 respectively and have the other end extending over pulleys 52 mounted on the tractor, said end of each cable being provided with a handle 53 and being conveniently located for the driver of the tractor.

In use of the device, when it is desired to lower the dump doors, the driver of the tractor pulls on the cable 50. Through the lever 24 and rod 26, the tripping member 23 is moved so that the projecting portion 25 thereof raises the dog supporting member 20 to cause disengagement of the dog 19 from the ratchet wheel 18 on the shaft 16. This will free the latter shaft and will permit the dump doors 11 to drop by gravity.

To raise the doors, the cable 51 is first pulled to cause a shifting of the clutch member 27 into engagement with the clutch member 30. This is accomplished through the action of the lever 49, rod 48, bell crank lever 46, and shifting arm 43. When the clutch members are in engagement, movement of the dump wagon will cause rotation of the wheel 34, sprocket wheel 33, sprocket wheel 31, and shafts 16. This will result in a winding of the cables 14 upon the drums 15, and the consequent raising of the doors. As the shaft 16 rotates, rotation will also be imparted to the clutch throw out gear 37 and throw out disk 38. The cam member 39 on the throw out disk is so positioned that when the doors are fully closed it will engage between the clutch members 30 and 27 to cause movement of the latter to a disengaging position.

From the foregoing description, it may be seen that a very novel device has been provided for automatically closing the dump doors upon movement of the wagon, the said closing being effected through the rotation of the wagon wheel. It may further be seen that both the raising and lowering of the doors can be controlled in a simple manner by the driver of the tractor from a convenient point.

Although only one form of the invention has been shown and described, it is not desired to be limited to the exact showing as the broad concept of the invention includes all changes and modifications as may come within the scope of the claims.

What I claim is:

1. In a vehicle having a body portion provided with a dump door, means in connection with said body for closing said door, driving mechanism for said means propelled by movement of the vehicle, a pair of relatively movable clutch members, between one of said members being carried by said closing means and the other of said members being carried by said driving mechanism, and an automatically operated timed clutch throw out disk rotatable adjacent said clutch members and having a cam portion for moving one of said clutch members to cause disengagement of said driving mechanism from said closing means when said door has been fully closed.

2. The combination with a dump vehicle having a body portion provided with a dump door and a second vehicle for pulling said dump vehicle, of door operating mechanism comprising means in connection with the body of said dump vehicle driven by movement of the vehicle for closing the door thereof, clutch mechanism on the dump vehicle for controlling the operating mechanism, and actuating means for said clutch mechanism operable from the second vehicle to cause closing of the doors.

3. The combination with a dump vehicle having a body portion provided with a dump door and a second vehicle for pulling said dump vehicle, of door operating mechanism comprising means in connection with the body of said dump vehicle driven by movement of the vehicle for closing the door thereof, clutch mechanism on the dump vehicle for controlling the operating mechanism, actuating means for said clutch mechanism operable from the second vehicle to cause closing of the door, and means operable from said second vehicle for causing the opening of said door.

In testimony whereof, I affix my signature.

FREDERICK A. STREICH.

CERTIFICATE OF CORRECTION.

Patent No. 1,820,993.                              Granted September 1, 1931, to

FREDERICK A. STREICH.

It is hereby certified that error appears in the printed specification of the above numbered patent requiring correction as follows: Page 2, line 87, claim 1, strike out the word "between"; and that the said Letters Patent should be read with this correction therein that the same may conform to the record of the case in the Patent Office.

Signed and sealed this 27th day of October, A. D. 1931.

(Seal)                                                            M. J. Moore,
                                                                Acting Commissioner of Patents.